United States Patent
Gavankar et al.

(10) Patent No.: US 12,253,973 B1
(45) Date of Patent: Mar. 18, 2025

(54) INTELLIGENT INFORMATION RETRIEVAL SYSTEM AND METHOD

(71) Applicant: Morgan Stanley Services Group Inc., New York, NY (US)

(72) Inventors: Shailesh Gavankar, Princeton, NJ (US); Afrid Mondal, Karnataka (IN); Keon Park, Yonkers, NY (US); Sanket Jain, Karnataka (IN); Abhijit Naik, Maharashtra (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/811,016

(22) Filed: Aug. 21, 2024

(51) Int. Cl.
*G06F 16/14* (2019.01)

(52) U.S. Cl.
CPC .................................. *G06F 16/152* (2019.01)

(58) Field of Classification Search
CPC ...................................................... G06F 16/152
See application file for complete search history.

(56) References Cited

U.S. PATENT DOCUMENTS

| | | | |
|---|---|---|---|
| 11,676,044 B1 | 6/2023 | Mazza et al. | |
| 11,681,541 B2 | 6/2023 | Mostafa | |
| 12,079,570 B1 * | 9/2024 | Mondlock | G06F 40/20 |
| 2007/0143273 A1 * | 6/2007 | Knaus | G06F 16/3338 |
| 2023/0060252 A1 | 3/2023 | Bly et al. | |
| 2023/0074406 A1 | 3/2023 | Baeuml et al. | |
| 2023/0252233 A1 | 8/2023 | Gutierrez et al. | |
| 2024/0020546 A1 * | 1/2024 | Vu | G06N 5/022 |
| 2024/0378636 A1 * | 11/2024 | Boyd | G06F 16/958 |
| 2024/0386015 A1 * | 11/2024 | Crabtree | G06F 16/9024 |

* cited by examiner

Primary Examiner — Angelica Ruiz
(74) Attorney, Agent, or Firm — Leason Ellis LLP

(57) ABSTRACT

Smart information retrieval is provided via artificial intelligence. Content stored in documents in a database is accessed and contextual chunks of individual ones of the documents are identified, wherein the contextual chunks include portions of content stored in the individual ones of the documents. Embeddings associated with the contextual chunks are generated and stored in a vector database. A plurality of relationships are defined among at least some of the contextual chunks and generates relational embeddings using the plurality of identified relationships. The relational embeddings are stored in a database. A query is received for information associated with at least some of the content and an embedding representing the query is generated. The embedding representing the query is transmitted to at least one large language model, and a response including at least some of the contextual chunks is received. The response is transmitted to a device associated with the query.

20 Claims, 6 Drawing Sheets

INTELLIGENT INFORMATION RETRIEVAL SYSTEM AND METHOD

FIELD

The present disclosure relates, generally, to data management and, more particularly, to an arrangement and method for improved operations associated with data parsing and handling.

BACKGROUND

Locating and using particular content remains problematic, particularly in the enterprise. This can be due to the content being stored in various facilities and formats, and across several datacenters. Unfortunately, even after content is located, latency can be incurred during access, which can negatively impact productivity and performance.

It is with respect to these and other considerations that the disclosure made herein is presented.

BRIEF SUMMARY

A computer-implemented system and method are provided for information retrieval via artificial intelligence. At least one computing device, configured by executing instructions stored on non-transitory processor readable media, accesses content stored in documents in at least one database. The at least one computing device identifies contextual chunks of individual ones of the documents, wherein the contextual chunks include portions of content stored in the individual ones of the documents. Further, the at least one computing device generates embeddings associated with the contextual chunks, and stores the embeddings in a vector database. Moreover, the at least one computing device identifies, as a function of natural language processing, a plurality of relationships among at least some of the contextual chunks and generates relational embeddings using the plurality of identified relationships. The relational embeddings are stored in a database. Still further, the at least one computing device receives, from at least one other computing device, a query for information associated with at least some of the content and the at least one computing device generates an embedding representing the query. The at least one computing device transmits, to at least one large language model, the embedding representing the query and receives, from the at least one large language model in response to the embedding representing the query, a response including at least some of the contextual chunks. Thereafter, the at least one computing device transmits the response to a computing device associated with the query.

In one or more implementations of the present disclosure, the at least one computing device is configured to calculate relevant weights for each of the documents and the contextual chunks.

In one or more implementations of the present disclosure, the at least one computing device is configured to apply at least some of the relevant weights to at least some of the documents and associated contextual chunks stored in the at least one database.

In one or more implementations of the present disclosure, the at least one computing device is configured to receive information associated with a user who provided the query. The relevant weights are calculated as a function of the information associated with the user.

In one or more implementations of the present disclosure, the at least one computing device is configured to the information associated with the user includes: authorization of the user to access; clickstream data associated with the user; and metadata associated with at least one of the documents.

In one or more implementations of the present disclosure, the at least one computing device is configured to rank associated chunks comprised in the response. Further, the at least one computing device determines, as a function of the ranking, whether the user is entitled to receive the response.

In one or more implementations of the present disclosure, the at least one computing device is configured to provide, to the computing device associated with the query, the response if the user is entitled to receive the response.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION OF THE EMBODIMENTS

Figure 1:
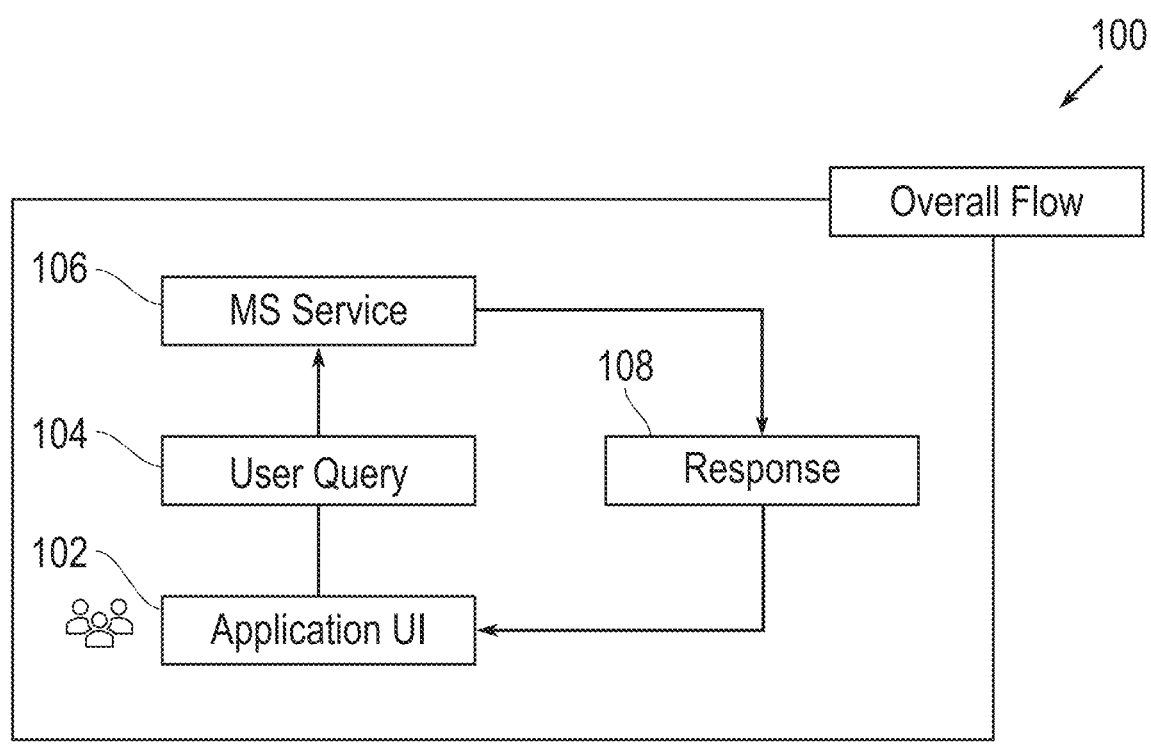
FIG. 1 is a simple block diagram illustrating a high-level view of aspects of smart information retrieval, in accordance with an implementation of the present disclosure.

By way of summary and introduction, the present disclosure includes technology for processing and accessing information stored in large volumes of variously formatted data from different sources. For example, technology is disclosed for retrieving specific information and creating chunk(s) related to one or more calling application's query from an enterprise knowledge base. The chunks can be used, thereafter, to generate one or more synthetic answers using, for example, a large language model. The present disclosure provides technological solutions for locating relevant and accurate content. The technical solutions provided herein improve performance, for example by reducing latency, including by reducing the amount of information otherwise required to locate a calling application's query responses. In one or more implementations, less data can be transmitted to, for example, a large language model (e.g., OPENAI), which is usable to uncover and transmit query results to calling application, including users thereof.

In one or more implementations, insights can be provided using many data types stored in an enterprise, such as documents and reports including video, audio, images, charts, tables, text, and hyperlinks, and the insights can be combined. Thereafter, contextual chunks of individual documents or reports can be created for generating embeddings. Embeddings representing contextual chunks can be stored in a database, such as a relational database of vectors (a "vector database") or other, for future access. Moreover, neuro-linguistic programming (NLP) and large language models, such as available in the enterprise pipeline, can be used to create relationships among the entities along with documents and associated metadata, such as relating to author, document type, creation/modification dates, or the like. Relational embeddings can be stored, for example in a graph database and, thereafter, an embedding of a calling application's query can be generated and used to access stored information. Relevant weights can be calculated for corresponding documents and corresponding chunks, as well as embeddings representing individual user's clickstream data, document metadata, as well as various business rules, which can be processed by a ranking and scoring model to refine selection of specific chunks that are particularly relevant to a user query. For example, information representing user selections (e.g., clicks on graphical screen controls, hyperlinks, or other interactivity, can be accessed and used for determining user navigation and use. Further, document metadata can include information representing publication date, authorship, domain types, title, keyword(s), and geographical information, of which at least some can be automatically determined. In one or more implementations of the present disclosure, after a document publishes, metadata can be accessed and stored in a file, such as an XML file. Ranking and scoring can be performed for various categories of data.

Thereafter, appropriate chunks are passed to one or more large language models to generate query responses. Accordingly, and in one or more implementations, the present disclosure includes technology that prompts for and receives information in the form of a user query, identifies chunks and generates one or more embeddings associated with the received query and, thereafter, locates similar embeddings stored in a vector database. Thereafter, information that is stored, for example, in a large language model is retrieved that corresponds to the located embeddings. Using the retrieved information, a response to the query is generated and provided. Moreover, additional processing can be used to identify particular aspects, or chunks, associated with the retrieved embeddings.

Referring now to the drawings, FIG. 1 is a simple block diagram illustrating a high-level view of aspects of the present disclosure for smart information retrieval. As illustrated in FIG. 1, an application interface 102, such as a graphical user interface, provides a user query 104 that is received and operated on by a back-end service 106. Processes associated with the back-end service, including as shown and described herein, can include maintaining and using a corpus for provide a response 108.

Figure 2:
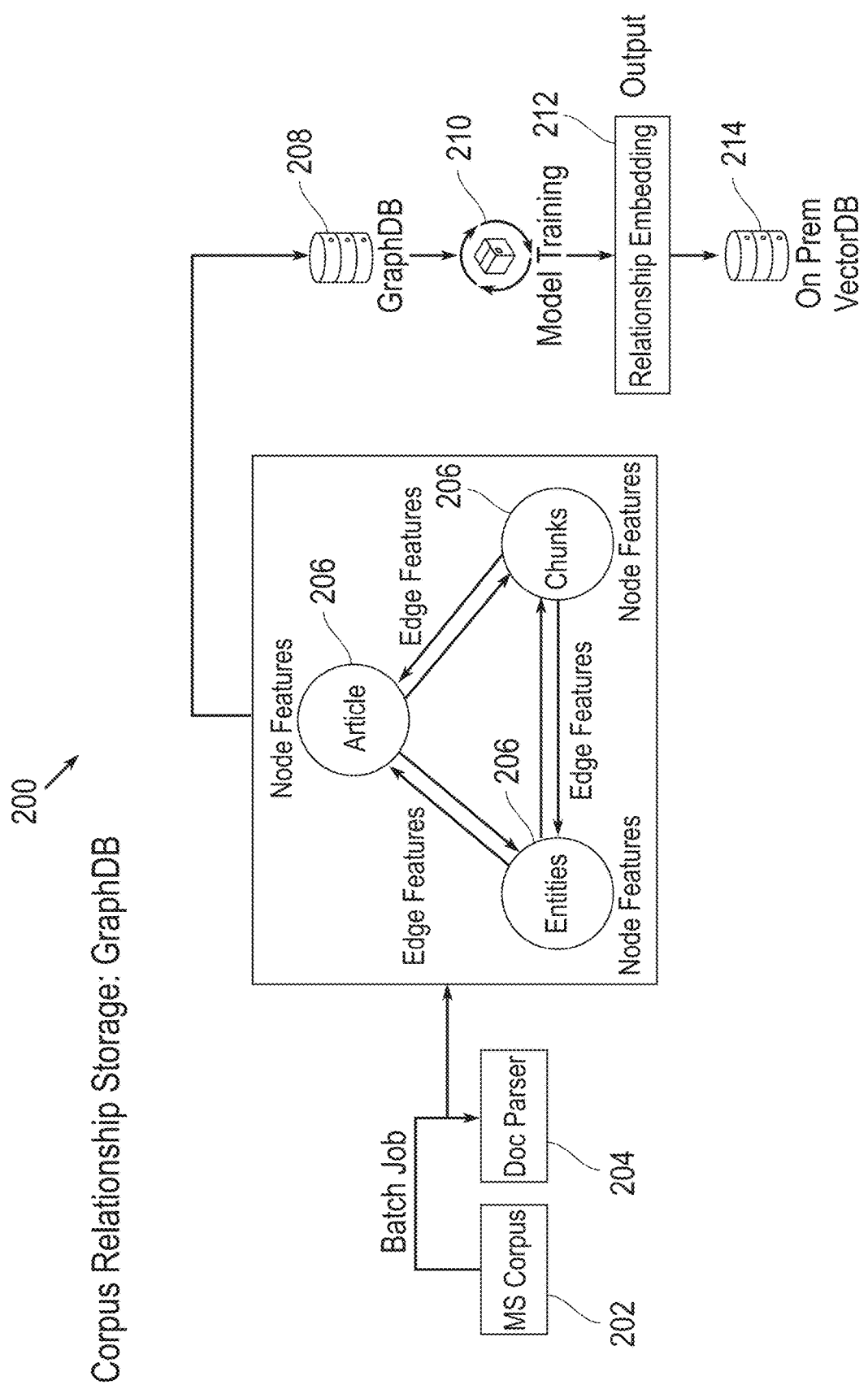
FIG. 2 is a block diagram illustrating corpus processing and storage, including natural language processing, machine learning, and artificial intelligence to generate embeddings, in accordance with an example implementation the present disclosure.

FIG. 2 is a block diagram illustrating corpus processing and storage 200, in accordance with an example implementation of the present disclosure, including natural language processing, machine learning, and artificial intelligence to generate embeddings. Content in a corpus 202 containing including, for example, documents, images, audio, video, or the like, can be processed (e.g., parsed) into chunks by a document parser 204. Edge features can be determined, for example, based on node features 206 associated with entities, such as metadata representing the author of a work, date of a work, portion of a work comprising the chunk, and various other entities identifying or representing the chunk, as well as content (e.g., an article) and chunks, can be processed, e.g., via GRAPHDB 208, and output can be used for training 210 during machine learning operations. Thereafter, relationship embeddings 212 representing an asset's meaning and/or context can be generated and stored, for example in a vector database 214, which can be used for locating similar assets as a function of neighboring data.

Figure 3:
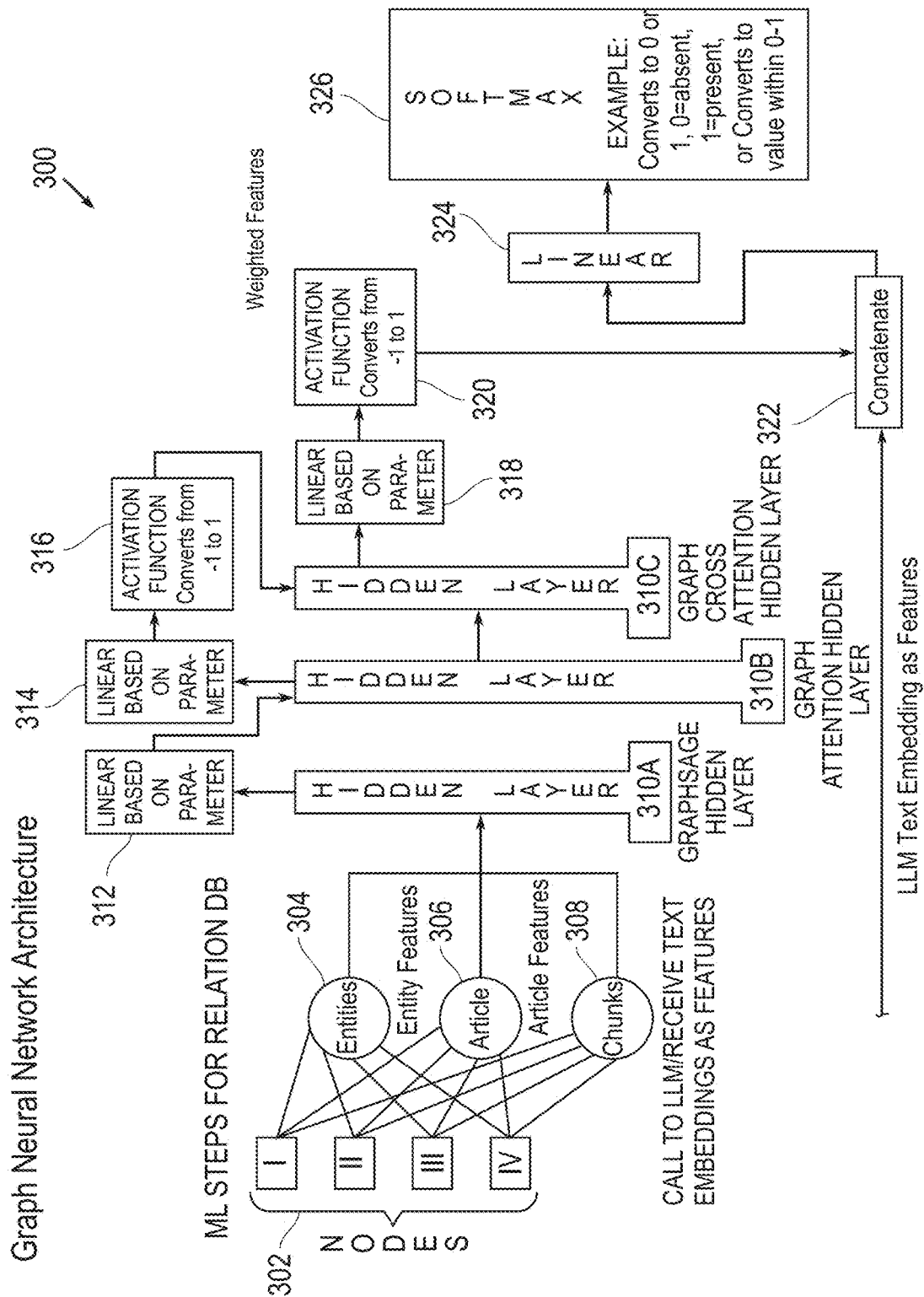
FIG. 3 is a block diagram illustrating an example graph-based neural network architecture in connection with machine learning for populating and maintaining a database, in accordance with an implementation of the present disclosure.

FIG. 3 is a block diagram illustrating an example graph-based neural network architecture 300 in connection with machine learning for populating and maintaining a database (e.g., a relational vector database), in accordance with an implementation of the present disclosure. As illustrated in FIG. 3, nodes 302 can include content, such as textual, audio, and visual content that is maintained in or otherwise accessed by an enterprise, and processed as a function of natural language processing to extract information from the content and generate entity features 304 and article features 306. Nodes 302 (e.g., textual content) can be parsed into chunks 308 and passed to a large language model, such as a request, and embeddings returned, which can represent features of the chunks. In the implementation shown in FIG. 3, entities 304, article features 306, and chunks 308 can be fed into layer(s) of an artificial neural network 310, which in the example shown in FIG. 3 is a graph-based neural network, such as GRAPHSAGE. The artificial graph neural network 310 includes a plurality of hidden layers 310A, 310B, and 310C, which can include input and output stages in the neural network for learning data structures, for example, associated with the nodes 302. Output from hidden layers 310A and 310B can be linear based on parameters, and used for input for further processing by a hidden layer. Additionally, output from 314 can be converted via an activation function 316, which is provided as input to hidden layer 310C. Thereafter, output can be linear based on parameter 316 and converted, such as via an activation function 320. Accordingly, entities can be processed via the graph-based neural network 310 (e.g., GRAPHSAGE), including through each of a plurality of hidden layers 312. Output from the graph-based neural network 310 can be further processed in feed forward processes.

Continuing with reference to the example graph neural network shown in FIG. 3, in addition to output from the graph-based neural network 310, chunks embeddings 308 can be transmitted and processed and concatenated 320 with output from the graph-based neural network. The results of the concatenation 322 can, thereafter, be further processed in feed forward processes, normalized and used as input in a linear layer 324. For example, a matrix multiplication can be applied using the normalized input and an internal trainable weight parameter. The output of the linear layer can be provided to, for example, a softmax function 326.

Thus, and shown and described herein with regard to FIG. 3, machine learning can be employed for generating and maintaining a vector database (e.g., a relational database) storing embeddings for future use in connection with one or more large language models. An echo system can be provided that is separable into modules for data curation, data ingestion, model building, vector-DB, clickstream, and inferencing. For example, a graph neural network model can be built on top of a curated graph with data curation, and input data curated as graph and passed as input to the model. In one or more implementations, nodes can include document identifiers, chunk(s) or phase identifiers that can be curated during a document parsing process, and entities (including keywords present in a document, or one or more chunks or phrases of content). Moreover, edges that represent a relationship among the respective nodes can be determined and analyzed to determine the strength of the relationship. Edge features can be categorized based, for example, types of relationships of respective connections. Once curated, the inputs can be passed through the graph neural network model.

The present disclosure supports a plurality of graph layers. For example, a first convolution layer can include a message passing layer, to accumulate the embedding. A second layer is attention network to accumulate the importance of a node with respect toother node. A third layer can include a cross-attention network, which is usable to decode a relationship with respect to the input and encoded relationship, passed by a previous layer. Loss can be calculated using regularization loss and Bayesian personalized ranking, and to maximize the positive predicted item over negative ones, to backpropagate to update the model parameters. Moreover, post model training can occur using all the information related to strength of relationship among all the entity, chunk, and documents.

According, the present application creates relationship among entities, phrases, chunks of a document dynamically, including to save numerical representations of relationships, described above (i.e., embeddings) in vector database. During inferential processing, input text can be converted to numerical format of embedding using model, and further used by the model to predict most closed phrases or chunks represents the input text. Further, close phrases or chunks are considered and used to generate one or more answers, such as by using a decoder-based large language model. Technological benefits realized by the present disclosure include reduction of latency and reduction (elimination) of inaccurate output (e.g., hallucinations) as a function of improved point context retrieval functionality. Furthermore, the present disclosure improves the expansibility of the reasoning of the model answer, and by combining clickstream information with data relationship, the personalization experience of a user is dramatically improved.

Figure 4:
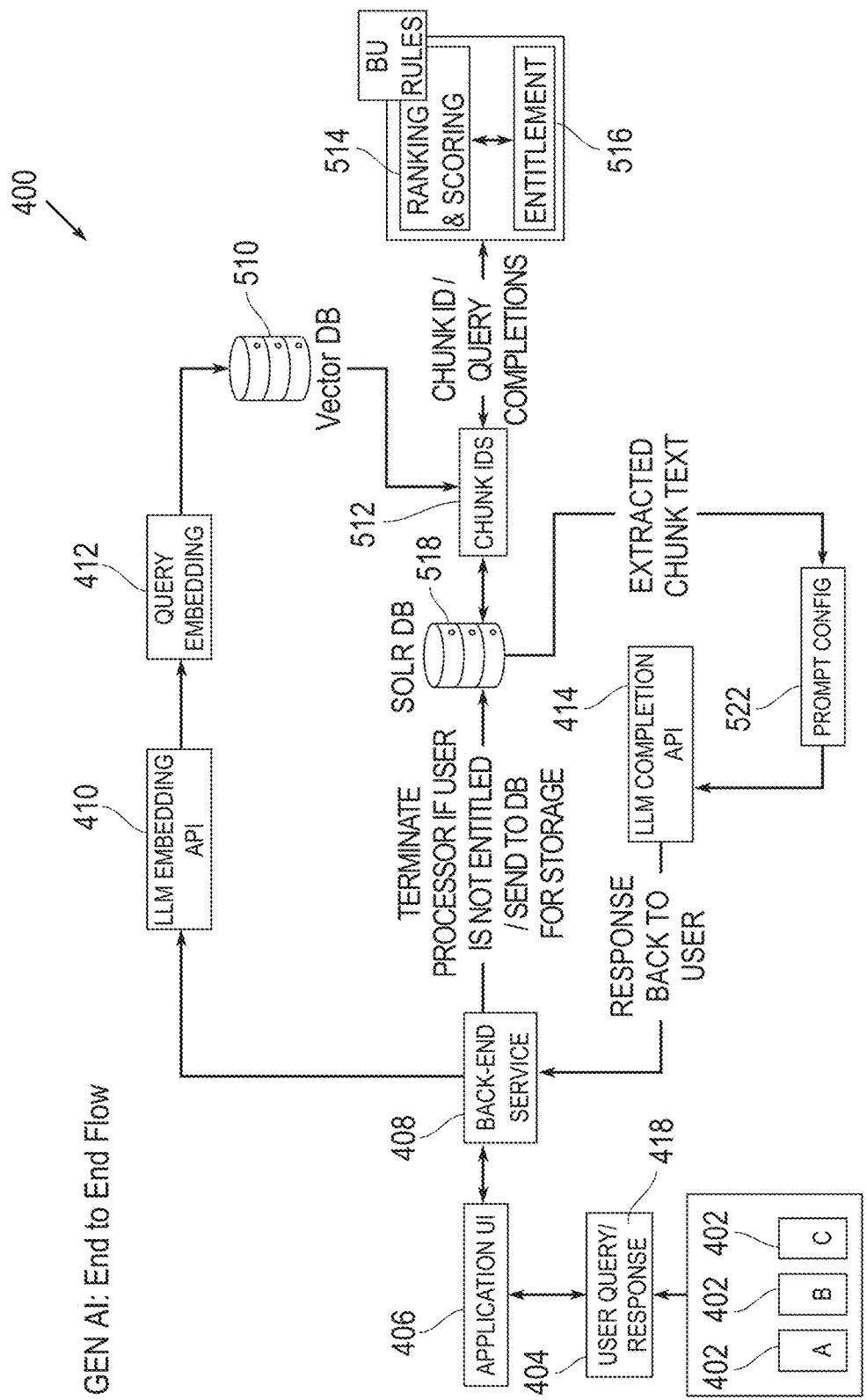
FIG. 4 is a diagram showing an example hardware arrangement for providing the systems and methods disclosed herein.

Referring to FIG. 4, a diagram is provided of an example hardware arrangement for providing the systems and methods disclosed herein, and designated generally as system 400. System 400 can include one or more data processing apparatuses that are at least communicatively coupled to one or more user computing devices across a communication network. Data processing apparatuses and user computing devices can include, for example, mobile computing devices such as tablet computing devices, smartphones, personal digital assistants or the like, as well as laptop computers and/or desktop computers. Further, one computing device may be configured as a data processing apparatus and a user computing device, depending upon operations be executed at a particular time. A data processing apparatus can be configured to access one or more databases, including documents, reports, audio content, video content, metadata, embeddings, and other information. In addition, data processing apparatus can be configured to access Internet websites and other online content. It is contemplated that data processing apparatus can access any required databases via communication network or any other communication network to which data processing apparatus has access. Data processing apparatus can communicate with devices including those that comprise databases, using any known communication method, including Ethernet, direct serial, parallel, universal serial bus ("USB") interface, and/or via a local or wide area network.

Figure 5:
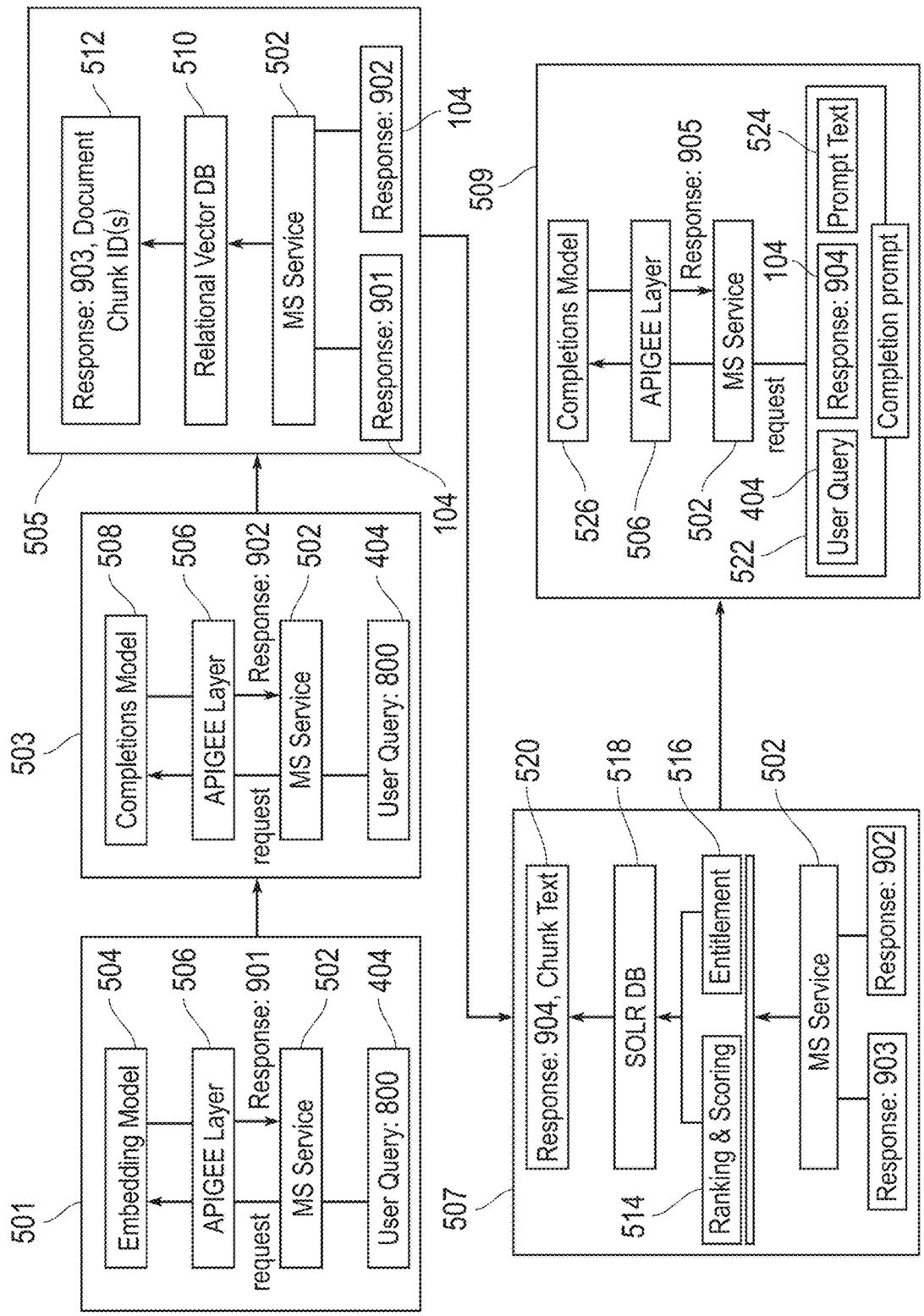
FIG. 5 is a block diagram illustrating modules for providing features and operations in accordance with one or more implementations of the present disclosure.

Continuing with reference to FIG. 4, applications 402 operating on devices located, for example, behind an organization's firewall submit queries requesting content stored in one or more databases managed or otherwise accessible to the organization. For example, a query 404 is received via an application user interface ("UI") 406, and passed to one or more backend services 408 for further processing. With reference to FIG. 5, modules 501, 503, 505, 507, and 509 are illustrated including features and operations in accordance with one or more implementations of the present disclosure. The modules can operate as interrelated units, including one or more computing device, software that is accessed there by and executed to configure the computing device(s) for particular operations, as well as content and information in a complex system for providing the features and functionality shown and described herein. As illustrated in FIG. 5, module 501 can include one or more back-end services 502 operate to pass the query 404 as a request to embeddings model 504, via an application programming interface ("API") management tool, such as APIGEE layer 506. Thereafter, embedding model 504 provides user query embedding response (901), such as embeddings representing the query, via layer 506.

In addition, or in the alternative, module 503 can include the query 404 being transmitted to one or more back-end services 502 and passed to completions model 508, via an API management tool, such as APIGEE layer 506. Thereafter, completions model 508 provides user query completion response (418), via layer 506. Query completion response (418) can include embeddings representing the user and/or calling application that submitted a query, such as metadata representing an individual user, demographics of a user, a user's title, access authentication, or virtually any other suitable information representing or associated with the user.

Continuing with reference to FIGS. 4 and 5, module 505 can include query embedding response (901) and query completions response 104 (902) can be passed to one or more back-end service 502. The back-end service 502 can formulate and pass the responses 104 (901) and (902) to a vector database 510 as a request. Thereafter, searches can be performed, such as a similarity search using vector data, for matches that are within a predefined threshold of similarity. In one or more implementations of the present disclosure, responses (903) include document chunk ID(s) 512. The responses (904), including chunk ID(s), and response (902) can be then submitted to a back-end service 502 for further analysis, such as via module 507, including to perform ranking and scoring operations 514 and to make a determination 516 whether a user and/or computing device is entitled (e.g., is authorized or is suitable) to receive to receive the information associated with the results received from the vector database 518. For example, information representing a user's clickstream data, document metadata, and an organization's business rules can be used for evaluating entitlement. In one or more implementations, a predetermined threshold value associated with the information can be compared with results of a calculation representing the combination of the chunk ID(s) and response (902). If the comparison is below the threshold, for example, then the user and/or computing device is deemed not to be entitled to receive results to the query. In such case, a message can be returned, such as representing responsive information is not available for delivery and explaining the reasons therefor. Continuing with this example, if, alternatively, the comparison is above the threshold, then the user is deemed to receive results to the query. In such case, the chunk ID(s) can be used to query a database 518, such as a SOLR database, for textual, video, audio, or other forms of content results. In one or more implementations, a response (904) from the database 518 can include chunk text 520.

Continuing with reference to FIGS. 4 and 5, once chunk text 520 has been received from a database 518, for example, a SOLR database, processes associated with module 509 can include generating a completion prompt 522. For example, the completion prompt 522 can include the user query 404, the response (904), and prompt text 524. The completion prompt 522 can be provided as a request to a back-end service 502 and sent, via an API management tool 506, such as APIGEE layer, to a completions model 526. Thereafter, the response from the completions model 526 can be forwarded, for example via a large language model completion API 424 for eventual transmission to application interface (or other resource) 406, via the API management tool 506 and back-end service 502.

Referring back to FIG. 4, in one or more implementations a user query 404 is received via an application interface 406 and processed via back-end service 408. Large language model embedding API 410 can be used for providing response 901 (FIG. 5) and query embedding API 412 for providing response 902 (FIG. 5). Responses 901 and 902 can include output from vector database 510, and chunk IDs 512. Chunk IDs 512 can be processed in accordance with business unit rules, including for ranking & scoring 514 and determining entitlement 516, such as in connection with a respective user's level of authorization. Chunk IDs 512 can be used to extract chunk text via LLM (e.g., SOLR database 518). Thereafter, completion prompt 522 is configured and a large language model completion API 414 provides the response 905 via back-end service 408 to the calling application.

In the event of a determination that the user is not authorized or otherwise entitled to receive a response 905 to the respective query 404, the process can terminate and results not transmitted to the calling application. One or more results 905, or at least a portion thereof, can be stored in a database, such as database 518 (e.g., the SOLR database) for further analysis and use.

Although many of the examples and descriptions shown and described herein regard an interface receiving and responding to queries submitted by users, it is envisioned herein that queries can be provided via automatic processes from one or more applications. In such instances, determinations of entitlement for responses to queries can be made based on calling applications, calling devices (e.g., locations of devices, types of devices, and configurations of devices), and other features that are relevant to an organization and associated business rules.

Figure 6:
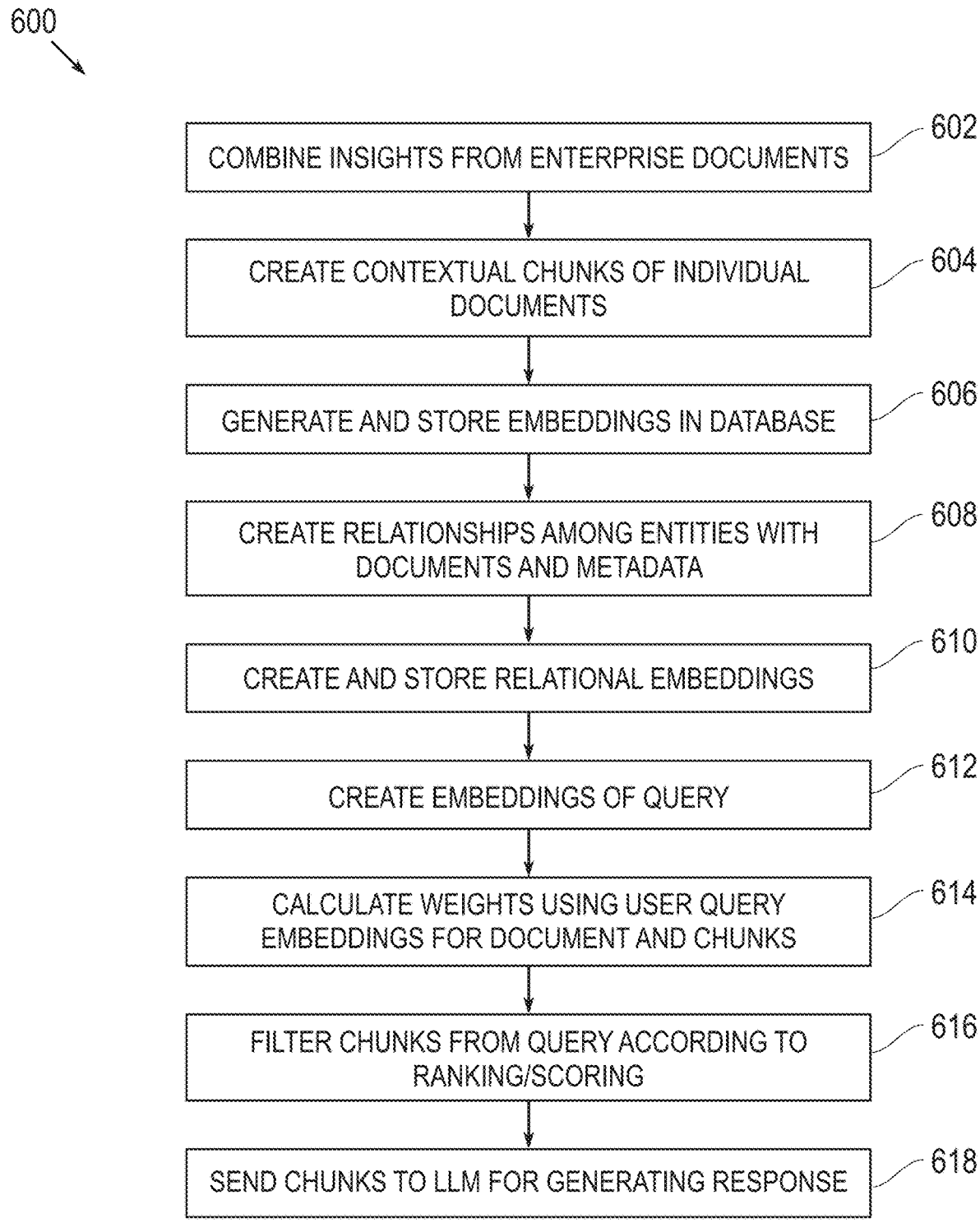
FIG. 6 is a flow diagram showing an example routine illustrating a method for intelligent information retrieval, in accordance with an example implementation of the present disclosure.

FIG. 6 is a flow diagram showing an example routine 600 that illustrates a method for intelligent information retrieval, in accordance with an example implementation of the present disclosure. It is to be appreciated that several of the logical operations shown and described herein are implemented as a sequence of computer-implemented acts or program modules running on one or more computing devices. Accordingly, the logical operations described herein are referred to variously as operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 6, the process begins at step 602 insights various data sources, such as enterprise documents, reports, audio, image, charts, tables, text, and hyperlinks (and content associated therewith), are combined. Thereafter, contextual chunks of individual documents other content are created (step 604). Embeddings representing contextual chunks can be generated and stored, for example, in a vector database (e.g., a relational database) (step 606). Relationships among the entities, along with documents and corresponding metadata (e.g., author, document type, or the like), can be created as a function of natural language programming and one or more language models, which can be developed by an organization or otherwise provided by one or more outside sources (step 608). Relational embeddings using relationships set forth step 608 can be generated and stored in a database, such as a graph database (step 610). At step 612, query embeddings can be created substantially in real-time, which can be used at step 614 to calculate relevant weights for the document and chunks. Using various information, such as an individual user's clickstream data, document metadata, and applied business rules, a ranking and scoring model can operate to narrow down the specific chunks, relevant to user query (step 616). Thereafter, the appropriate chunks to a large language model (e.g., SOLR database) to generate a response (step 618).

Accordingly, the present disclosure provides improvements in information retrieval technology, including by retrieving specific information to create chunk(s) related to a user's query from an enterprise's knowledge base, and to generate synthetic answer(s) as a function of one or more large language models. Using the features shown and described herein, the present disclosure includes locating the right content and chunks associated with context, against user's query to generate a response using a large language model. The present disclosure provides improved searching capabilities, better content recommendations, and improved information retrieval for synthetic answer generation.

Although many of the examples shown and described herein regard distribution of coordinated presentations to a plurality of users, the disclosure and invention(s) therein is not so limited. Although illustrated embodiments of the present invention have been shown and described, it should be understood that various changes, substitutions, and alterations can be made by one of ordinary skill in the art without departing from the scope of the present disclosure.

What is claimed:

1. A computer-implemented method for information retrieval via artificial intelligence, the method comprising:
    accessing, by at least one computing device configured by executing instructions stored on non-transitory processor readable media, content stored in documents in at least one database;
    identifying, by the at least one computing device, contextual chunks of individual ones of the documents, wherein the contextual chunks include portions of content stored in the individual ones of the documents;
    generating, by the at least one computing device, embeddings associated with the contextual chunks;
    storing, by the at least one computing device, the embeddings in a vector database;
    identifying, by the at least one computing device as a function of natural language processing, a plurality of relationships among at least some of the contextual chunks;

generating, by the at least one computing device, relational embeddings using the plurality of identified relationships;

storing, by the at least one computing device, the relational embeddings in a database;

receiving, by the at least one computing device from at least one other computing device, a query for information associated with at least some of the content;

generating, by the at least one computing device, an embedding representing the query;

transmitting, by the at least one computing device to at least one large language model, the embedding representing the query;

receiving, by the at least one computing device from the at least one large language model in response to the embedding representing the query, a response including at least some of the contextual chunks; and transmitting, by the at least one computing device, the response to a computing device associated with the query.

2. The method of claim 1, further comprising:

calculating, by the at least one computing device, relevant weights for each of the documents and the contextual chunks.

3. The method of claim 2, further comprising:

applying, by the at least one computing device, at least some of the relevant weights to at least some of the documents and associated contextual chunks stored in the at least one database.

4. The method of claim 2, further comprising:

receiving, by the at least one computing device, information associated with a user who provided the query;

wherein the relevant weights are calculated as a function of the information associated with the user.

5. The method of claim 4, wherein the information associated with the user includes:

authorization of the user to access;

clickstream data associated with the user; and metadata associated with at least one of the documents.

6. The method of claim 4, further comprising:

ranking, by the at least one computing device, associated chunks comprised in the response; and determining, by the at least one computing device as a function of the ranking, whether the user is entitled to receive the response.

7. The method of claim 6, further comprising:

providing, to the computing device associated with the query, the response if the user is entitled to receive the response.

8. A computer-implemented system for information retrieval via artificial intelligence, the system comprising:

at least one computing device that executes instructions stored on non-transitory processor readable media, wherein the at least one computing device is configured by executing the instructions to:

access content stored in documents in at least one database;

identify contextual chunks of individual ones of the documents, wherein the contextual chunks include portions of content stored in the individual ones of the documents;

generate embeddings associated with the contextual chunks;

store the embeddings in a vector database;

identify, as a function of natural language processing, a plurality of relationships among at least some of the contextual chunks;

generate relational embeddings using the plurality of identified relationships;

store the relational embeddings in a database;

receive, from at least one other computing device, a query for information associated with at least some of the content;

generate an embedding representing the query;

transmit, to at least one large language model, the embedding representing the query;

receive, from the at least one large language model in response to the embedding representing the query, a response including at least some of the contextual chunks; and transmit, the response to a computing device associated with the query.

9. The system of claim 8, wherein the at least one computing device is further configured by executing the instructions to:

calculate relevant weights for each of the documents and the contextual chunks.

10. The system of claim 9, wherein the at least one computing device is further configured by executing the instructions to:

apply at least some of the relevant weights to at least some of the documents and associated contextual chunks stored in the at least one database.

11. The system of claim 9, wherein the at least one computing device is further configured by executing the instructions to:

receive information associated with a user who provided the query, wherein the relevant weights are calculated as a function of the information associated with the user.

12. The system of claim 11, wherein the information associated with the user includes:

authorization of the user to access;

clickstream data associated with the user; and metadata associated with at least one of the documents.

13. The system of claim 11, wherein the at least one computing device is further configured by executing the instructions to:

rank associated chunks comprised in the response; and determine, as a function of the ranking, whether the user is entitled to receive the response.

14. The system of claim 13, wherein the at least one computing device is further configured by executing the instructions to:

provide, to the computing device associated with the query, the response if the user is entitled to receive the response.

15. A non-transitory computer readable medium having computer instructions stored therein that, when executed by at least one computing device, cause the at least one computing device to carry out an automated process, the process comprising:

accessing, by the at least one computing device, content stored in documents in at least one database;

identifying, by the at least one computing device, contextual chunks of individual ones of the documents, wherein the contextual chunks include portions of content stored in the individual ones of the documents;

generating, by the at least one computing device, embeddings associated with the contextual chunks;

storing, by the at least one computing device, the embeddings in a vector database;

identifying, by the at least one computing device as a function of natural language processing, a plurality of relationships among at least some of the contextual chunks;

generating, by the at least one computing device, relational embeddings using the plurality of identified relationships;

storing, by the at least one computing device, the relational embeddings in a database;

receiving, by the at least one computing device from at least one other computing device, a query for information associated with at least some of the content;

generating, by the at least one computing device, an embedding representing the query;

transmitting, by the at least one computing device to at least one large language model, the embedding representing the query;

receiving, by the at least one computing device from the at least one large language model in response to the embedding representing the query, a response including at least some of the contextual chunks; and transmitting, by the at least one computing device, the response to a computing device associated with the query.

16. The computer readable medium of claim 15, wherein the process further comprises:

calculating, by the at least one computing device, relevant weights for each of the documents and the contextual chunks.

17. The computer readable medium of claim 16, wherein the process further comprises:

applying, by the at least one computing device, at least some of the relevant weights to at least some of the documents and associated contextual chunks stored in the at least one database.

18. The computer readable medium of claim 16, wherein the process further comprises:

receiving, by the at least one computing device, information associated with a user who provided the query;

wherein the relevant weights are calculated as a function of the information associated with the user.

19. The computer readable medium of claim 18, wherein the information associated with the user includes:

authorization of the user to access;

clickstream data associated with the user; and metadata associated with at least one of the documents.

20. The computer readable medium of claim 18, wherein the process further comprises:

ranking, by the at least one computing device, associated chunks comprised in the response; and determining, by the at least one computing device as a function of the ranking, whether the user is entitled to receive the response.

* * * * *